(12) United States Patent
Sather (10) Patent No.: US 7,366,973 B2
(45) Date of Patent: Apr. 29, 2008

(54) ITEM, RELATION, ATTRIBUTE: THE IRA OBJECT MODEL

(75) Inventor: Dale A. Sather, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 09/767,455

(22) Filed: Jan. 23, 2001

(65) Prior Publication Data

US 2002/0143815 A1 Oct. 3, 2002

(51) Int. Cl.
G06F 17/00 (2006.01)
(52) U.S. Cl. ............... 715/234; 715/237; 715/242
(58) Field of Classification Search ......... 715/513, 715/514, 515, 530, 234, 237, 242
See application file for complete search history.

(56) References Cited

U.S. PATENT DOCUMENTS

| | | | | |
|---|---|---|---|---|
| 5,893,109 | A * | 4/1999 | DeRose et al. | 707/104.1 |
| 6,055,529 | A | 4/2000 | Furlani | |
| 6,083,276 | A | 7/2000 | Davidson et al. | |
| 6,108,698 | A * | 8/2000 | Tenev et al. | 709/220 |
| 6,574,644 | B2 * | 6/2003 | Hsu et al. | 715/501.1 |
| 6,611,847 | B1 * | 8/2003 | Fontana et al. | 707/201 |
| 6,665,863 | B1 * | 12/2003 | Lord et al. | 717/144 |
| 6,681,221 | B1 * | 1/2004 | Jacobs | 707/5 |
| 6,912,538 | B2 * | 6/2005 | Stapel et al. | 707/101 |

OTHER PUBLICATIONS

B. Cheng, "The Object-Oriented Development of a Distributed Multimedia Environmental Information System" *Proceedings of IEEE 6th International Conference on Soft. Eng. & Know. Eng.*, Jun. 1994, p. 70-77.

"Document Object Model (DOM)", http://www.w3.org/DOM/, Viewed Aug. 9, 2000, p. 1-3.

"XML DOM User Guide", http://msdn.microsoft.com/xml/XMLGuide/dom-guide-overview.asp, Viewed on Sep. 22, 2000, p. 1-2.

"Using the SMLDOMDocument Object", http://msdn.microsoft.com/xml/xmlguide/dom-guide-document.asp, Viewed on Sep. 22, 2000, p. 1-5.

"XSL Patterns", http://msdn.microsoft.com/xml/xslguide/patterns-overview.asp, Viewed on Sep. 22, 2000, p. 1.

"XSL Pattern Syntax", http://msdn.microsoft.com/xml/reference/xsl/XSLPatternSyntax.asp, Viewed on Sep. 22, 2000, p. 1-3.

"Operators and Special Characters", htt/://msdn.microsoft.com/xml/reference/xsl/OperatorsandSpecialCharacters.asp, Viewed on Sep. 22, 2000, p. 1-4.

* cited by examiner

Primary Examiner—Stephen Hong
Assistant Examiner—Matthew Ludwig
(74) Attorney, Agent, or Firm—Perkins Coie LLP (57) ABSTRACT

A system and method for providing a document object model to represent components of related entities for in-memory representations. The system and method provide for tangled data structures that are more readily parsed than conventional object models. Data is represented as items, relations and attributes. Items are described in terms of relations and attributes. Relations represent item associations. While attributes, represent other information about items. The present invention solves the problems associated with representing an XML document as a DOM component. The DOM component does not allow for relations of text with elements.

16 Claims, 9 Drawing Sheets

ITEM, RELATION, ATTRIBUTE: THE IRA OBJECT MODEL

TECHNICAL FIELD

The present invention relates to computer systems, and more particularly to a system, a method and an object model for representing a document in memory.

BACKGROUND OF THE INVENTION

Web documents are stored on web servers and are provided to client computers over the Internet upon receipt at the web server of a request for the document in the form of a uniform or universal resource locator ("URL"). The URL specifies the communications protocol by which the information is to be transferred and the Internet address of the host or web server upon which the document is stored. The URL may also specify a directory path and file name for the document. The communications protocol for the web is the hypertext transfer protocol ("HTTP"). Documents or pages stored on web servers and available over the web are generally formatted in a markup language. Markup language web documents contain text and a number of tags which provide instructions as to how the text should be displayed, which text should be hyperlinked to other documents, and where other types of content, including graphics and other images, video and audio segments, application programs or applets, image maps, and icons, that should be retrieved from and displayed in the document. One of the most commonly used standardized markup languages is the Hypertext Markup Language ("HTML"), currently available in several versions. Other standardized markup languages include the Standard Generalized Markup Language ("SGML") and the Extensible Markup Language ("XML").

Some document languages such as SGML and XML can represent documents as trees with each node of the tree labeled with a tag and each node's immediate descendants taking in order having tags that satisfy a production corresponding to the parent's tag. Therefore, a document can be represented as a complete parse tree satisfying the production rules of a grammar. XML was created by the World Wide Web Consortium to overcome the shortcomings of HTML. XML allows a document developer to create tags that describes the data and create a rule set referred to as a Document Type Definition (DTD) to apply to the data rules to the data. Several XML parsers have evolved that can read, decode and validate the text based document extracting the data elements in a platform independent way so that applications can access the data objects according to another standard referred to as the Document Object Model (DOM). DOM is an application program interface (API) that defines a standard for developer interaction with XML data structured tree elements. Therefore, XML document and DOM or XML DOM provides developers with programmatic control of XML document content, structure, and formats by employing script, Visual Basic, C++ and other programming languages.

However, the problem with representing an XML document or other markup language document in XML DOM is DOM's inability to represent relationship between elements or represent tangled structures. Additionally, DOM has problems with representing attributes of elements that have been defined in different forms. Accordingly, there is an unmet need in the art for providing a document object model that overcomes the aforementioned deficiencies with DOM.

SUMMARY OF THE INVENTION

The present invention is a system and method for providing a document object model (hereinafter referred to as an "IRA Object Model") to represent components of related entities for in-memory representations. The system and method provide for tangled data structures that faithfully represent the intended semantics in a manner different from conventional object models. Data is represented as items, relations and attributes. Items are described in terms of relations and attributes. Relations represent item associations, while attributes, represent other information about items. The present invention solves the problems associated with representing an XML document as a DOM component.

In one aspect of the invention, an XML document can be represented by the IRA Object Model. A rule set is employed to establish relationship between items. The rule set allows for relations to be defined and provides the information necessary to parse through the data structure to determine the relations of text to elements. Alternatively, a schema may be employed providing the necessary rule set and provide the necessary information. Additionally, an XML document represented as a DOM component can be transformed into an IRA Object Model or an IRA Object Model can be transformed back into a DOM component and converted to a XML document.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings. The present invention is described with reference to a system and method for providing and employing a document object for in-memory representation of systems of related entities. The data representation of the present invention employs three components, namely, items, relationships and attributes. An item can represent any 'thing' that a user, such as a client, wishes to represent as an item. A relation provides a named, directed relationship between two items. An attribute associates a labeled value with an item. Items are described in terms of relations and attributes. Relations represent item associations and attributes represent other information about items.

The present model (hereinafter referred to as "IRA") shares a kinship with Extensible Markup Language (XML) compliant documents and the XML Document Object Model (DOM). IRA enables persistence in XML form and a high degree of synergy with various XML-related technologies. The XML DOM converts syntactic text from a XML document and converts the syntactic text to a hierarchical semantic object model. The IRA Object Model converts syntactic text from a XML document and converts the syntactic text to a tangled structure or relational semantic object model, such that elements, attributes and text can be linked by relations between one another. Therefore, overcoming the deficiencies with XML DOM's inability to provide a tangled structure topology to XML documents transformed to data structures residing in memory. Although the present example will be illustrated with reference to an XML document and XML DOM, it is to be appreciated that the present system and invention may be applied to other application description files, such as HTML, SGML and the like.

Figure 1:
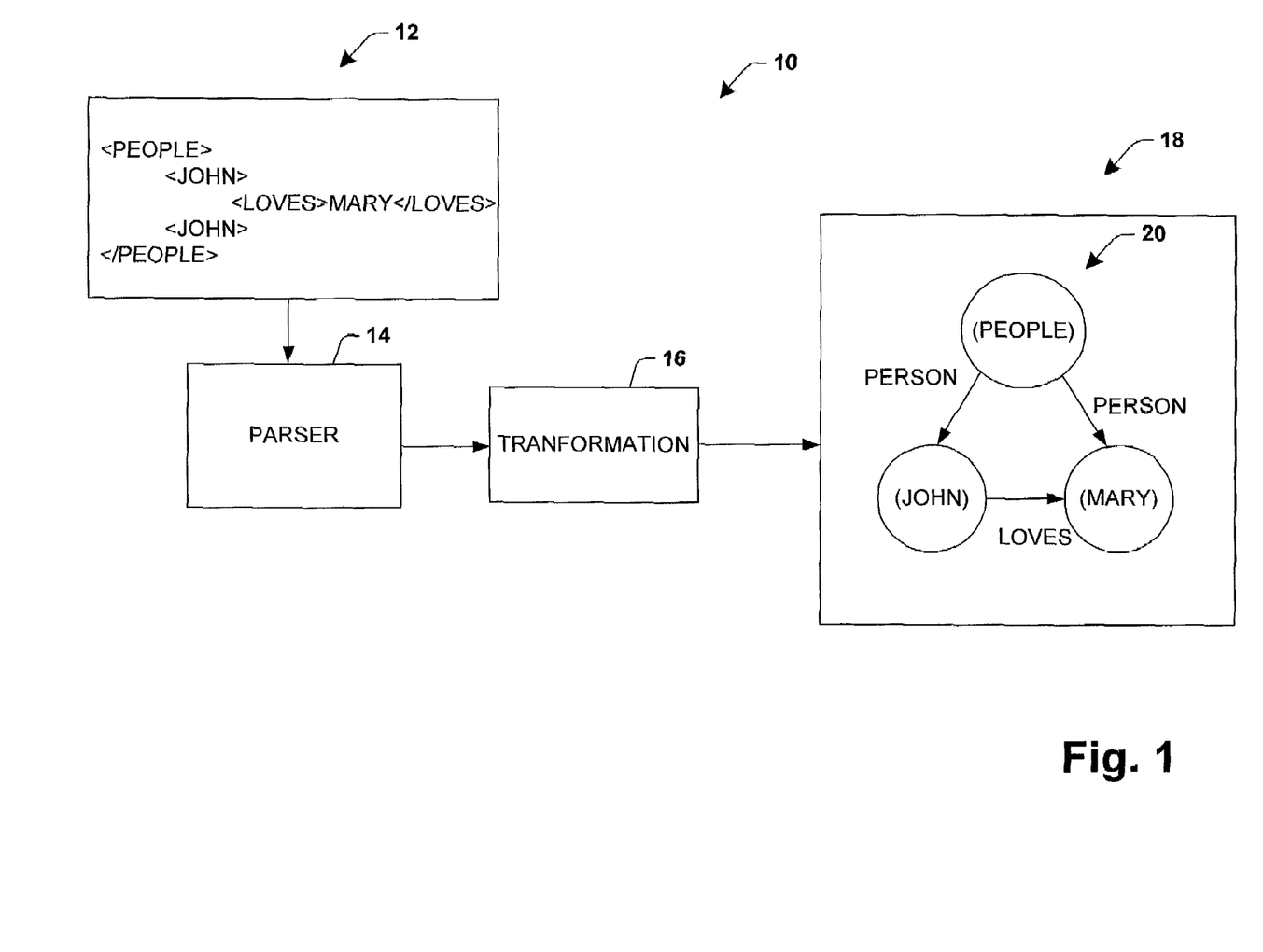
FIG. 1 illustrates a block diagram of a system for transforming a document into an IRA Object Model in accordance with one aspect of the present invention.

FIG. 1 illustrates an example of a system 10 for transforming an XML document 12 to a data structure 20 residing in a memory conforming to an IRA Object Model 18. The XML document 12 is parsed by a parser 14 to provide a list of semantic elements and attributes to a transformation component 16. The list of semantic elements and attributes are then transformed or mapped to the data structure 20 conforming to the IRA Object Model 18. As illustrated in the XML document 12, the document includes a number of elements with parent child relationships. The data elements as represented in XML DOM would include a hierarchical structure with "People" as a top node and a first leaf or branch of the element "John" having subnodes "Loves" and "Mary" and a second leaf or branch with the node "Mary". A parser that is selected to retrieve or match information from the second branch would retrieve the element "Mary" without any knowledge of the relationship that "John Loves Mary". However, the present model represents structures in terms of relationships between elements or items, therefore, the relationship that "John Loves Mary" is easily discernable from the present model. As can be seen in the data structure 20, a parser can retrieve information with respect to "Mary" by following the relationship between the "People" node to the "Mary" node to determine that Mary is a person and follow the relationship between the "Mary" node and the "John" node to determine that Mary is loved by John. Therefore, the present model presents data structure in terms of relationships, and not merely in terms of elements (or items) and attributes as is the case in XML DOM.

Figure 2:
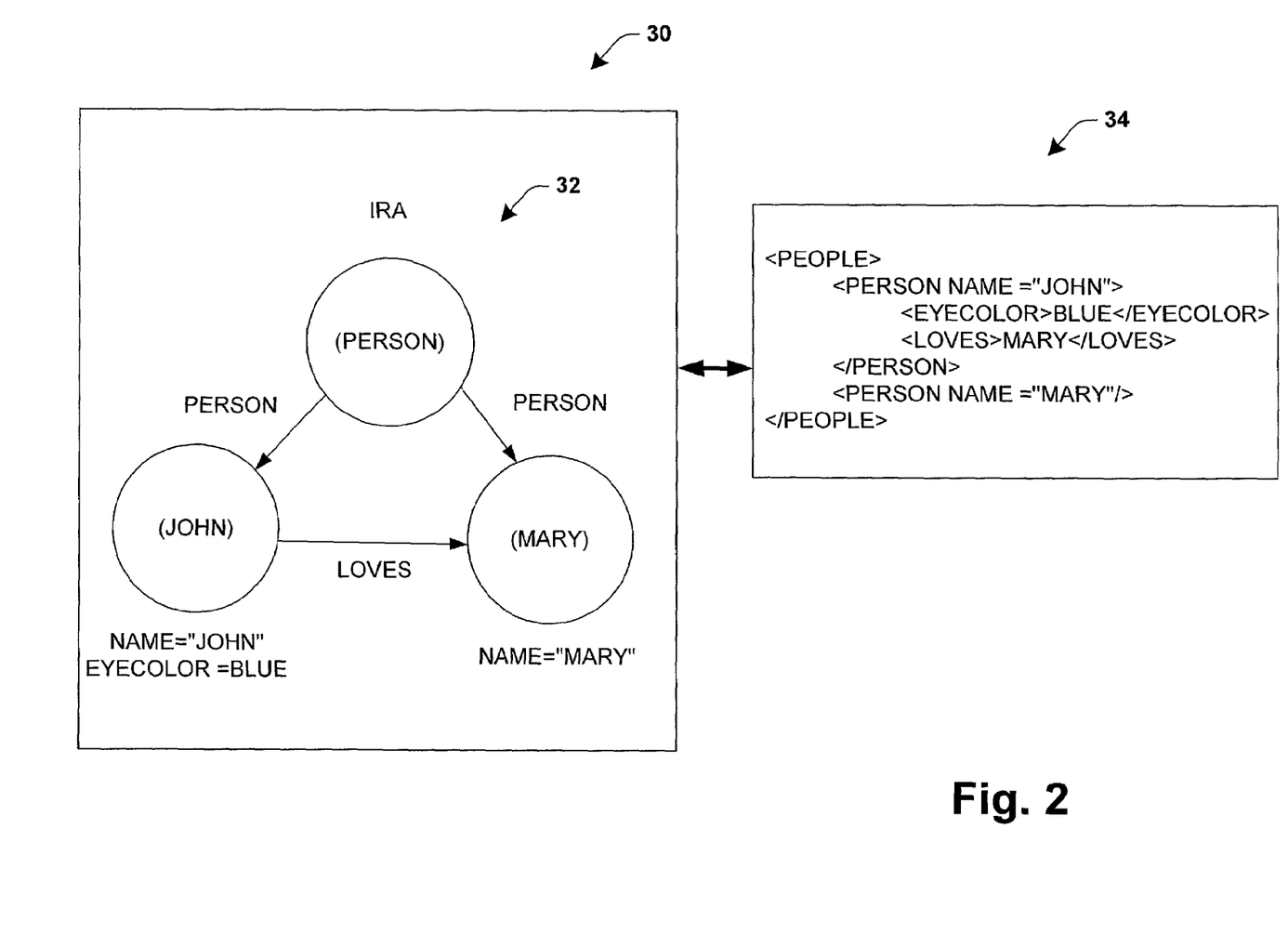
FIG. 2 illustrates a representation of a data structure in an IRA Object Model and as an XML document in accordance with one aspect of the invention.

FIG. 2 illustrates a representation of a data structure 32 as an IRA Object Model 30 and a XML document 34 were attributes in addition to elements for XML or items for IRA are involved. The example of FIG. 2 illustrates where an IRA user would like to represent the following two facts, that "John loves Mary" and that "John's eyes are blue". As can be seen from FIG. 2, John and Mary would be represented as items in IRA. IRA items are not implicitly named or labeled as is illustrated by the parenthesis around the names, but are defined in terms of relations with one another. The fact that John loves Mary would be represented as a relation named 'loves' with the John item as the subject and the Mary item as the object. Such a relation would be distinct from one in which Mary was the subject and John was the object ("Mary loves John"). The fact that John has blue eyes can be represented as an attribute of the John item named 'eyeColor' with the value 'blue'.

In order to identify the items, attributes can be added for John and Mary's names, for example, an attribute of the John item named 'name' with the value 'John' and an attribute of the Mary item named 'name' with the value 'Mary'. Furthermore, John and Mary can be related to the people node as persons. This can be done by creating an item representing all people. The John and Mary items could be related to the people item using 'person' relations of which the people item is the subject. The resulting system of items, relations and attributes is represented graphically as illustrated in the data structure 32.

The information of the data structure 32 can easily be represented in XML. The XML document 34 represents particular example for illustrating the data structure 32. However, it is to be appreciated that the data structure 32 can be represented in an XML document in a number of different ways. The IRA data structure 32 can map to XML by mapping an IRA item to an XML element, and the XML document 34 can be mapped to the IRA data structure 32 by parsing XML elements to become IRA items. IRA relations correspond to XML element parent/child relationships and those XML attributes and 'property elements' (e.g., such as <loves>Mary</loves>) whose values identify elements that correspond to IRA items. IRA attributes correspond to those XML attributes and property elements whose values do not identify IRA items.

For example, in <eyecolor>blue</eyecolor>, "blue" does not refer to something that would be represented by an item. Mapping between IRA and XML is defined in an IRA's default parsing behavior. By default, an XML element is parsed to become an IRA item. Parent and child elements become related items in which the relation has the child's name, the parent is the subject, and the child is the object. For example, the XML expression:

```
<car>
    <engine/>
</car>
``` would produce two items related by and "engine" relation whose subject was the item corresponding to the "car" element and whose object was the item corresponding to the "engine" element. In contrast to XML, IRA does not recognize parent child elements or items as names but as a relationship between the names of the items. The tag of the top IRA item is not discarded but shows up as a relation of the top IRA item to a root item.

Figure 3:
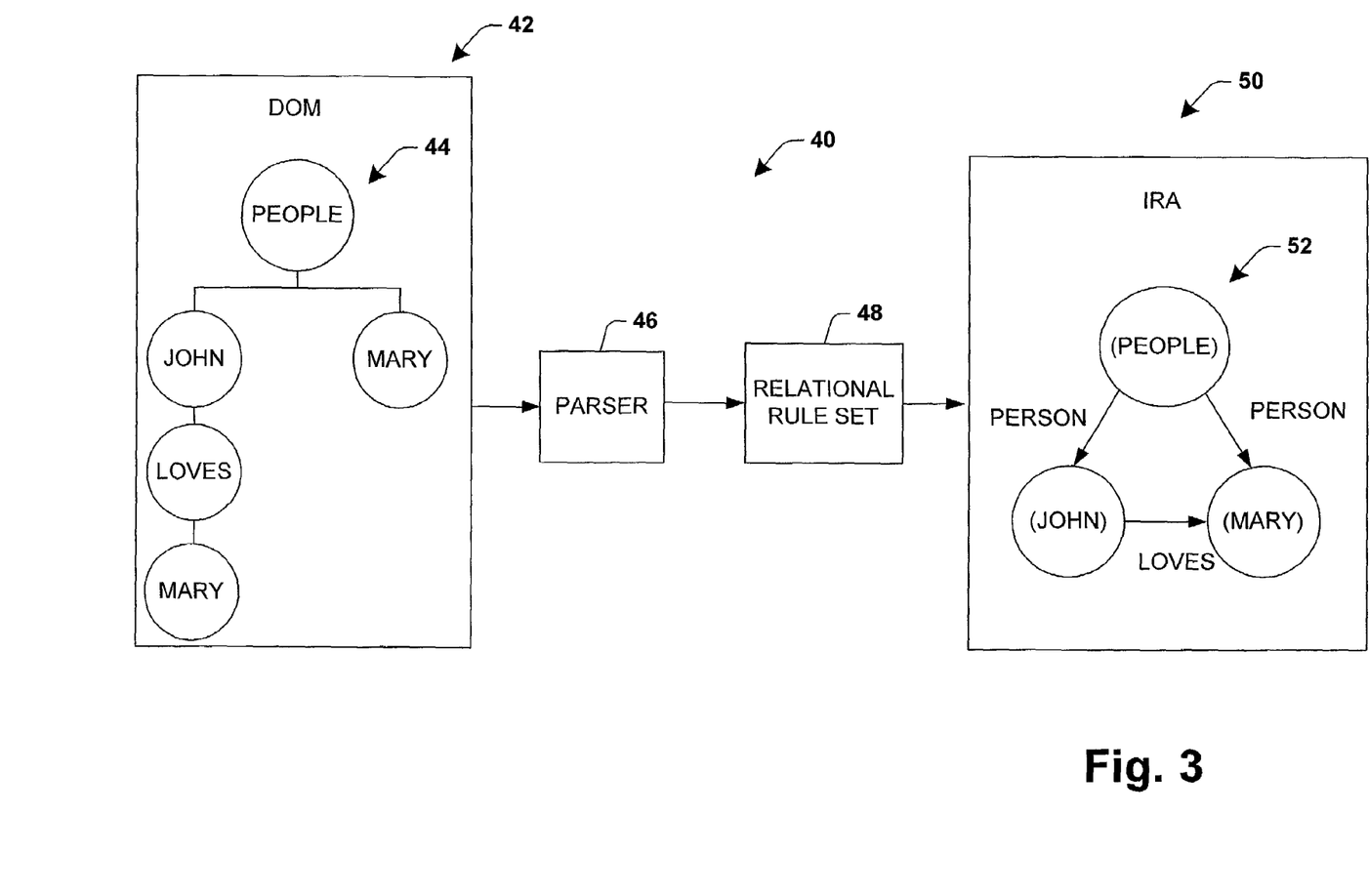
FIG. 3 illustrates a block diagram of a system for transforming a data structure conforming to DOM to a data structure conforming to the IRA Object Model in accordance with one aspect of the present invention.

FIG. 3 illustrates a system 40 for transforming a data structure 44 conforming to DOM 42 to a data structure 52 conforming to an IRA Object Model 50. The present system and method employs a parser component 46 and a relational rule set 48 to transform data structures conforming to DOM to data structures conforming to an IRA Object Model. The relational rule set 48 can be similar to the methodology of the transformation component 16 described in FIG. 2. Additionally, the transformation component 16 of FIG. 1 can be a relational rule set, for example, applying patterning rules.

In one aspect of the invention, the mapping of XML syntax into IRA semantics is accomplished using IRA patterns (e.g., constructors). Patterns express how XML elements and attributes change an IRA system when they are parsed in the context of a given XML element. One of the more powerful features of the XML DOM is its ability to apply XSL patterns to nodes. IRA patterns are similar to XSL patterns, but there are important differences mostly having to do with the differences between the IRA Object Model and XML DOM. In the IRA Object Model 62, there is no implicit parent/child relationship between items as there is between elements in XML. In IRA, parent/child relationships are defined in terms of relationships. For example, examining the following document:

```
<car>
    <engine/>
</car>
```

The context for pattern matching is the car element or item. In XML, we might use the pattern 'engine' to traverse from the car element to its child engine element. In IRA, the same pattern string traverses the 'engine' relation to get to the engine item.

When top-level XML elements are parsed in the default manner employing the IRA Object Model 62, a root item becomes the subject of the relation. IRA patterns are evaluated in a context, which is an item that serves as the starting point for the pattern matching process (e.g., the subject). The simplest pattern fragments navigate through the system of items, relations and attributes by indicating what relations are to be traversed starting at the context. These traversals establish a new context for the rest of the pattern. For example, the pattern "author" matches all items that are objects of an 'author' relation of which the context item is the subject. Further traversals may be added using '/' as the separator. This pattern "author/birthplace" matches all items that can be reached from the context item by traversing first an 'author' relation and then a 'birthplace' relation both in the subject-to-object direction. Assuming the context is an item representing a book, the book has only one author and the author has only one birthplace, the pattern would produce the single item representing the birthplace of the author. The pattern "author/birthplace/~birthplace" illustrates traversals in the object-to-subject direction and returns all items that are the subject of a 'birthplace' relation of which the author's birthplace is the object.

Constructors can be employed to map XML syntax into IRA semantics. Patterns can specify the construction of items, relations and attributes. Constructors take one of three forms:

```
<pattern> & <tag> <argument>
<pattern> & ~ <tag> <argument>
<pattern> & @ <tag> <argument>
```

In all three cases, the initial pattern establishes the context for the constructor, indicating to what item a relation or attribute is to be added. The first form creates a relation in which the context item is the subject. The second form (with the '~') creates a relation in which the context item is the object. The third form creates an attribute of the context item. The tag indicates the name of the relation or attribute. The optional argument supplies the object item of the new relation or the value of the new attribute. If no argument is supplied for a relation constructor, a new item is created to serve as the value of the argument. Constructors that produce relations establish a new context, that being the argument value. This makes it possible to chain constructors together to produce multiple relations and items.

Variables may be used in IRA patterns to capture and recall context. Any variable that contains an item as its value can be used to recall the item to serve as the context. Patterns can match the values of attributes as well as items. Filters allow patterns to further qualify the matched set. For example, the pattern "author/birthplace/~birthplace[~author]" finds all the people who are authors whose birthplace is the same as that of an author of the context (e.g., a book). Methods can be invoked from within a pattern. Methods receive the context in which they were invoked and an argument or set of arguments. Upon completion, methods produce a value.

A parsing rule can be expressed as follows: the tag of the contextual XML element—that is, the parent element in the context of which the rule applies, the tag of the XML element or attribute to be parsed and the pattern to be invoked when the element or attribute is parsed in the context of the contextual element. When the rule 'fires', the pattern is invoked in a context that was established by the rule that parsed the contextual element. When an element is parsed, the text contained in the element is passed as the first and only actual parameter to the pattern. When an attribute is parsed, the value of the attribute is passed as the first and only actual parameter to the pattern. IRA defines default rules for parsing XML elements and attributes. By default, the value of the new IRA attribute is the same as the value of the XML attribute. In many cases 'attribute-like' information appears in XML in the form of an element with a single text child node. In IRA, such elements are made into a relation and an item and the text is dropped unless a pattern is provided specifying the desired parsing behavior. In this case, a relation 'eyeColor' would be created with the context as the subject and a new item corresponding to the eyeColor element as the object.

Figure 4:
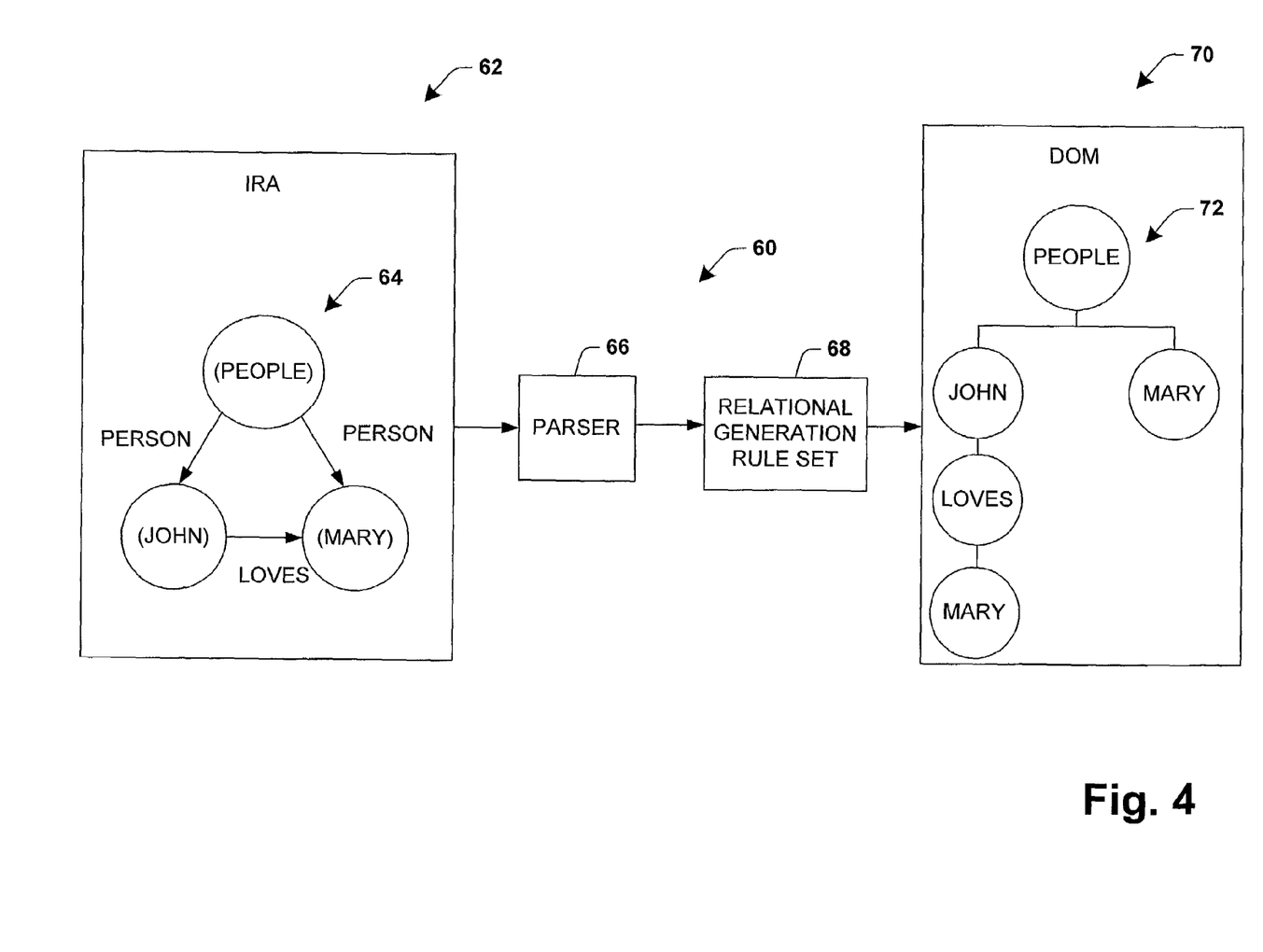
FIG. 4 illustrates a block diagram of a system for transforming a data structure conforming to the IRA Object Model to a data structure conforming to DOM in accordance with one aspect of the present invention.

FIG. 4 illustrates a system 60 for transforming a data structure 64 conforming to an IRA Object Model 62 to a data structure 72 conforming to DOM 70. The present system and method employs a parser component 66 and a relational generation rule set 68 to transform data structures conforming to the IRA Object Model 62 to data structures conforming to DOM 70. The data structures can then be mapped to XML elements of a XML document. The data structure of the IRA Object Model 62 can be directly mapped to XML elements of a XML document. The mapping of an IRA system into an XML document can be accomplished using IRA patterns, though additional semantics are required to direct the generation of XML elements and attributes. IRA pattern methods can be defined as:

```
!xmlEmitElement(<tag>)
!xmlEmitAttribute(<tag>,<value>)
!xmlEmitText(<value>)
!xmlMoveTo(<xPath>)
```

The method xmlEmitElement generates an XML element with the indicated tag. The method xmlEmitAttribute generates an XML attribute with the indicated tag and value. The method xmlEmitText generates an XML text node with the indicated value. The method xm1Move To changes the current XML DOM node as described below. All XML generation is done in the context of a current XML DOM node for which children are being generated. The generation process starts with a specific IRA item and a specific XML DOM node as the context. In many cases, generation will start with the IRA system's root item and the XML DOM document (which is also an XML DOM node). The navigation of these two aspects of the context through their respective systems of objects is a key aspect of the generation process. The XML methods affect navigation in the XML DOM as follows: xmlEmitElement moves to the element (also a node) created by the invocation of the method, xmlEmitAttribute moves to the null element (no element), xmlEmitText moves to the null element (no element) and xm1Move To moves to the location specified by the XPath expression.

Given a context, including a current IRA item and a current XML DOM node, it is easy to see how XML might be generated from the IRA system. Addressing first the parser's default behavior for parsing elements and attributes, the following rules can be created for generating elements and attributes. Relations are parsed from child elements according to the following parsing pattern: context/parsed->&parsed( ). Addressing only the action part of the rule (right hand side), the corresponding generation rule uses the pattern: !xmlEmitElement (<name of relation>). After the pattern is invoked, generation would proceed recursively to the IRA item that is the object of the relation. The method moves the current XML DOM node to the new element. Attributes are parsed from XML attributes according to the following parsing pattern as described in the XML parsing section: context/@parsed->?value?&@(parsed(%value%).

The corresponding generation rule uses the pattern: !xmlEmitAttribute(<name of attribute>,<value of attribute>). No recursion is required here. This can be recognized in a generation algorithm by the fact that the pattern leaves the current XML DOM node at the null element. Non-standard behavior can be specified as well. The XML parsing above describes the parsing of expressions such as, <eyeColor>blue</eyeColor>, using a rule such as person/eyeColor->?value?&@eyeColor(%value%). The corresponding generation rule uses the pattern: ?value?!xmlEmitElement("eyeColor")!xmlEmitText (%value%). Borrowing from the parsing scheme, when XML is generated for an attribute, the attribute value is the first actual parameter to the pattern. In this pattern, the formal parameter value is assigned this attribute value. No recursion is required because we are generating XML for an IRA attribute. This can be recognized in a generation algorithm by the fact that the pattern leaves the current XML DOM node at the null element. The text is embedded in the new element because of the navigation behavior of xmlEmitElement.

The XML parsing above describes the parsing of expressions such as <loves>Mary</loves>(e.g., in the context of a John element) using a rule such as: person/loves->?value?&loves(~person/person[name=%value%]).

The corresponding generation rule uses the pattern: !xmlEmitElement ("loves") !xmlEmitText(@name). The pattern @name is executed in the context of the object of the loves relation (Mary) and produces her name. No recursion is required here. This can be recognized in a generation algorithm by the fact that the pattern leaves the current XML DOM node at the null element. In a given context, patterns such as these can easily be applied as long as they are obtainable by relation or attribute name. This yields a set of rules for the context, such as: @eyeColor->?value?!xmlEmitElement ("eyeColor") !xmlEmitTex t(%value%) loves->!xmlEmitElement ("loves")!xmlEmitText(@name).

It is to be appreciated that IRA patterns or a pattern rule set may be employed to transform an XML document to a data structure conforming to the IRA Object Model as illustrated in FIG. 1. Conversely, patterns may be employed to transform a data structure object model to an XML document as illustrated in FIG. 2. Additionally, IRA patterns may be employed to provide the functionality associated with the relational rule set component 48 and relational generation rule set component 48 illustrated in FIG. 3 and FIG. 4, respectively.

Figure 5:
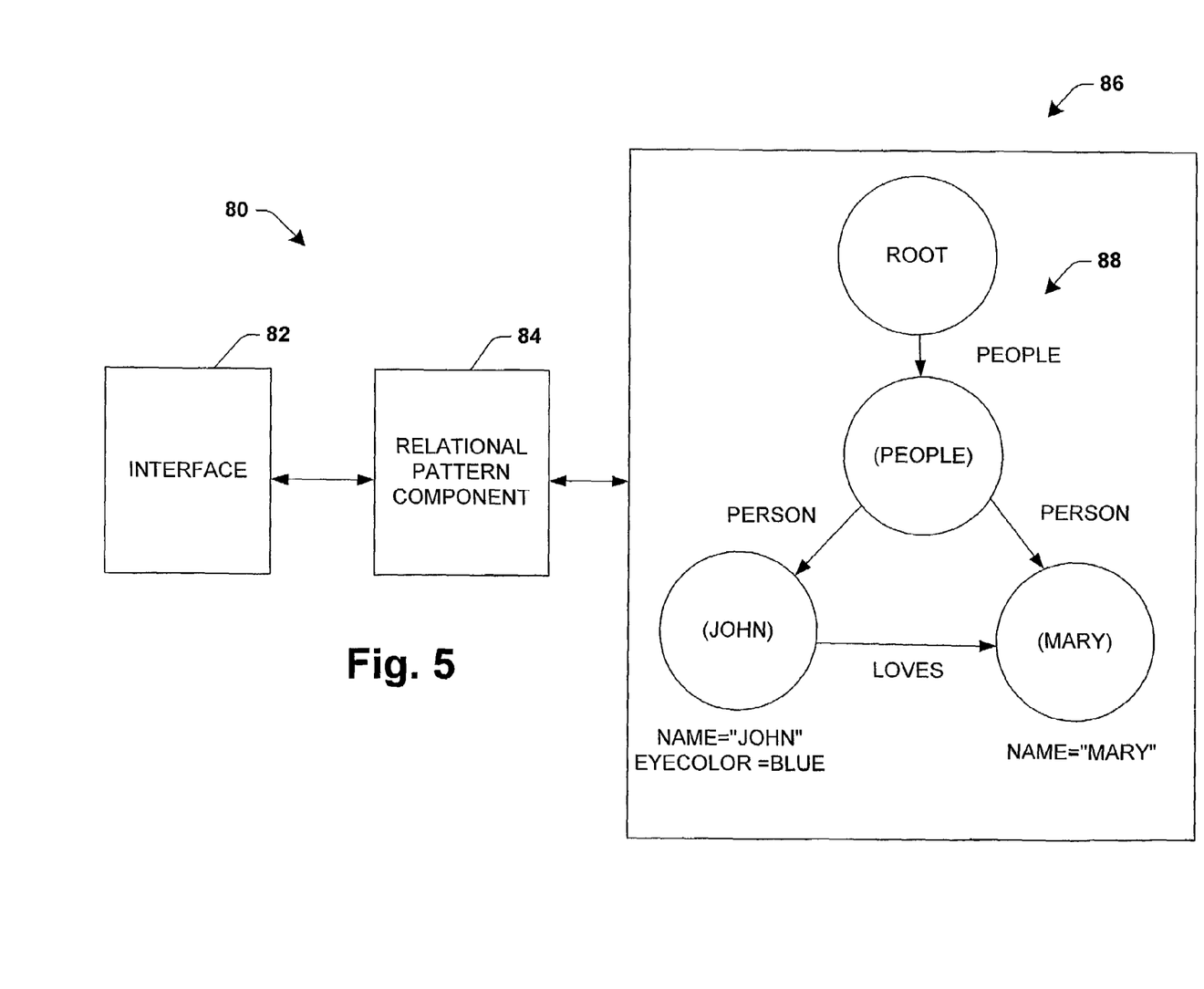
FIG. 5 illustrates a block diagram of a system for providing exposure to a data structure conforming to the IRA Object Model in accordance with one aspect of the present invention.

FIG. 5 illustrates a system 80 that provides exposure of a data structure 88 conforming to an IRA Object Model 88 to other applications and programs. A pattern component 84 is operable to provide access to one or more pattern rules for querying, removing and inserting data in to the data structure 88. The pattern component 84 is coupled to the data structure 88 and an interface component 82. The interface component 82 can be one or more application program interfaces (APIs), for example, an API for interfacing with Java script, an API for interfacing with C++ or an API for interfacing with COM components. The interface component 82 allows applications or programs access to the one or more pattern rules for accessing data items, attributes and relations. As illustrated in the data structure 88 of FIG. 5, a root item is provided as the top level node. Therefore, traversal from the root node (e.g., subject) to the people node (e.g., the object) provides a relationship of people between the nodes. Alternatively, traversing upward from the people node (e.g., object) to the root node (e.g., the subject) provides the relationship people.

Figure 6:
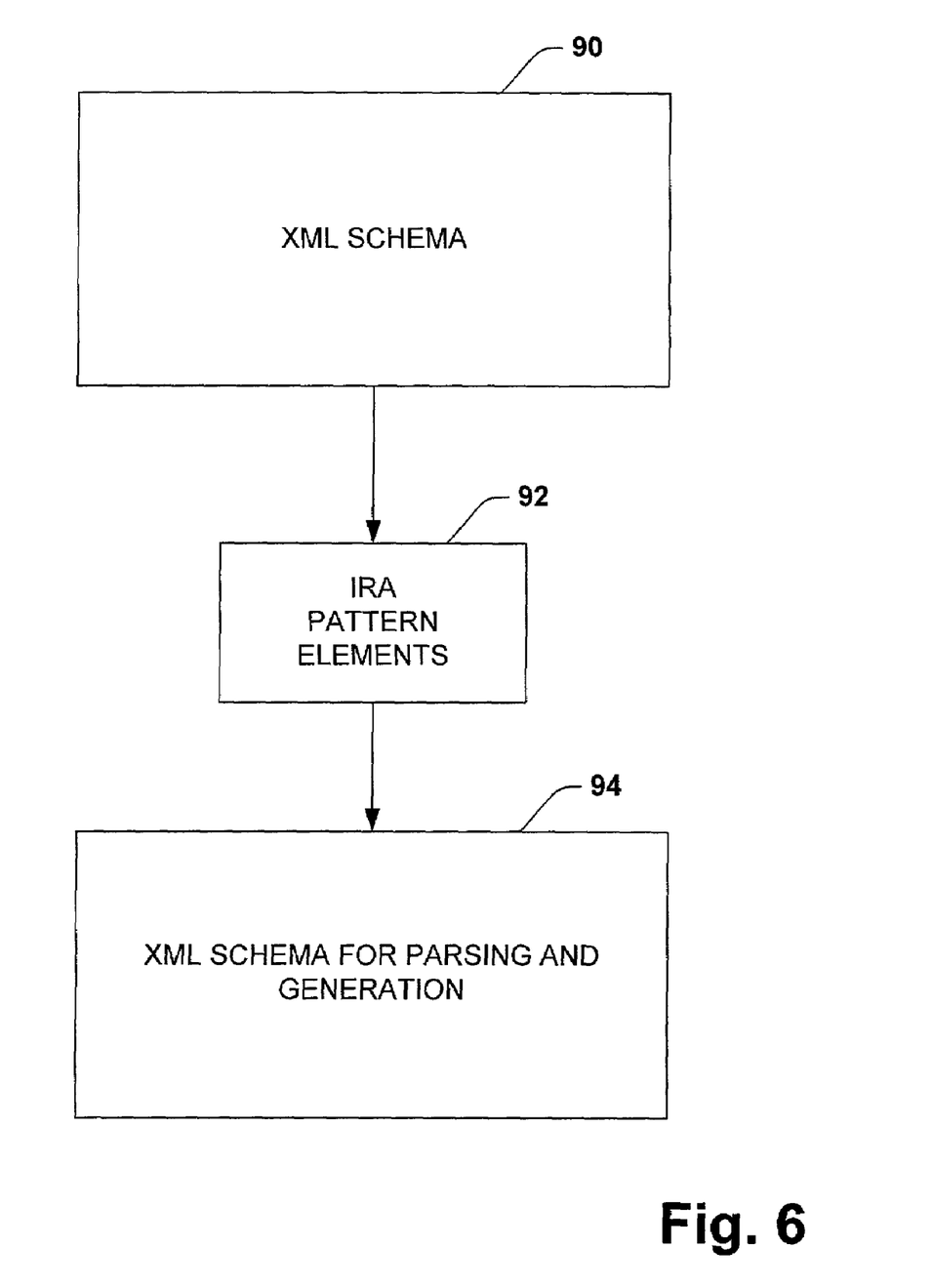
FIG. 6 illustrates a mechanism for providing an IRA schema from an XML schema in accordance with one aspect of the present invention.

By analogy from XML schemas, an IRA schema describes what relations and attributes may appear in an IRA system conforming to that schema. A set of XML parsing rules as described in the previous section would constitute an IRA schema. XML schemas can be formally expressed using XML Schema, a dialect of XML. XML Schema is extensible, allowing IRA parsing rules to be added to an XML schema document. FIG. 6 illustrates a mechanism for providing an IRA schema 94 by adding IRA pattern elements 92 to 'element' and 'attribute' elements in an XML schema 90. The IRA schema 94 can then be employed to transform an XML document to a data structure conforming to an IRA Object Model as illustrated in FIG. 1. Conversely, an IRA schema may be employed to transform a data structure object model to an XML document as illustrated in FIG. 2. Additionally, IRA schemas may be employed to provide the functionality associated with the relational rule set component 48 and relational generation rule set component 68 illustrated in FIG. 3 and FIG. 4, respectively.

In order to create a complete scheme for XML generation, a means of obtaining the correct set of rules in a given context is required. First, the rules can be associated with abstract IRA items in an IRA schema. This approach has the disadvantage of requiring a second schema in addition to the XML schema. Secondly, rules can be associated with abstract XML elements in an XML schema. In one way, the XML schema is ideal for directing the generation process because it specifies exactly what XML structures are permitted. The generation algorithm would never generate any XML that is not specified in the schema, so the resulting output would be valid with respect to the schema. The default rules for both parsing and generation as they would appear in a schema are as follows:

in accordance with the present invention, occur in different orders and/or concurrently with other steps from that shown and described herein. Moreover, not all illustrated steps may be required to implement a methodology in accordance with an aspect the present invention.

Figure 7:
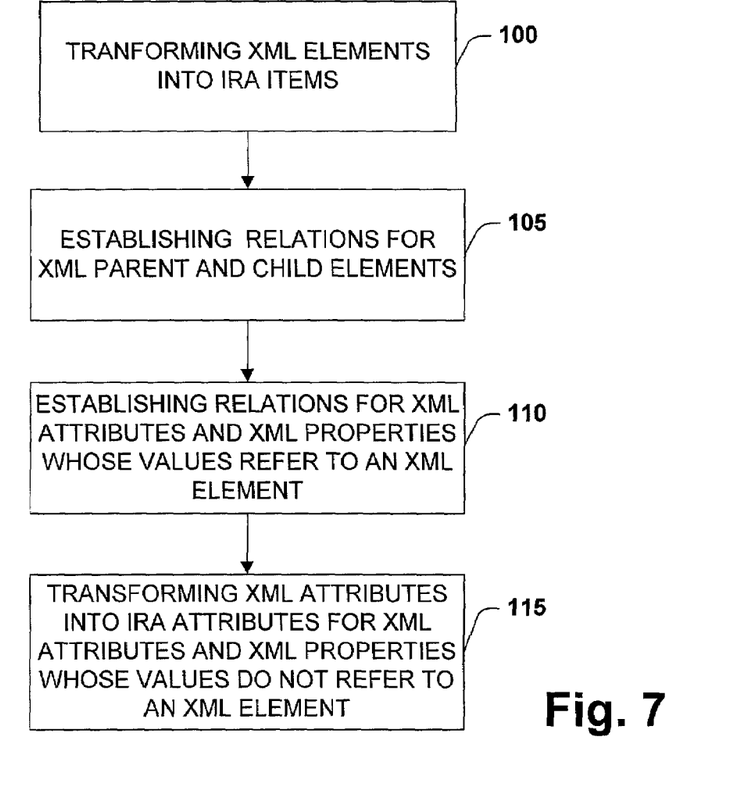
FIG. 7 illustrates a flow diagram of one particular methodology for transforming an XML document to an IRA data structure in accordance with one aspect of the present invention.

FIG. 7 illustrates a methodology for transforming an XML document into a data structure conforming to an IRA Object Model in accordance with one aspect of the present invention. At step 100, XML elements are transformed into IRA items. At step 105, relations are established for XML parent and child elements. At step 110, relations are established for XML attributes and XML properties whose values refer to an XML element. XML attributes are then transformed into IRA attributes for XML attributes and XML properties whose values do not refer to an XML element at step 115. The above methodology may be employed utilizing a relational rule set, an IRA pattern or an IRA schema.

Figure 8:
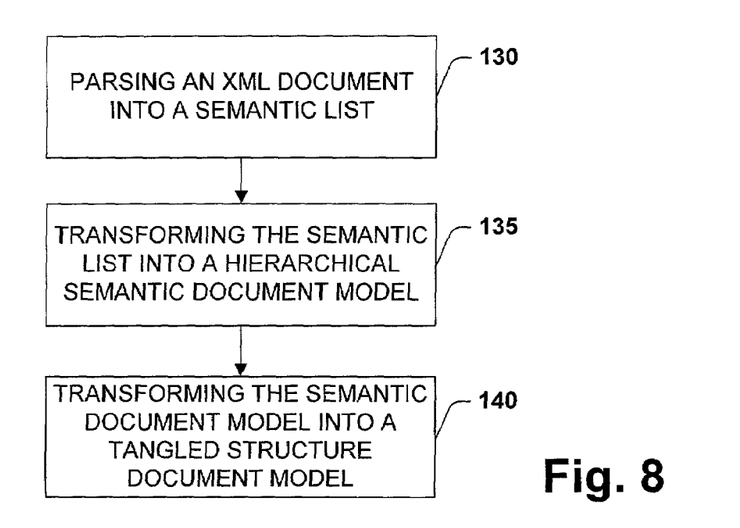
FIG. 8 illustrates a flow diagram of one particular methodology for transforming an XML document having a data structure conforming to DOM to an IRA data structure in accordance with one aspect of the present invention.

FIG. 8 illustrates a methodology for transforming an XML document into a data structure conforming to an IRA Object Model in accordance with another aspect of the present invention. At step 130, an XML document is parsed to provide a semantic list. At step 135, the semantic list is transformed into a data structure conforming to a hierarchical semantic document model. At step 140, the data structure

```
<ELEMENT TYPE="SOMEELEMENT">
    <IRA:PARSE>&SOMEELEMENT( )</IRA:PARSE>
    <IRA:GENERATE>!XMLEMITELEMENT("SOMEELEMENT")</IRA:GENERATE>
</ELEMENT>
<ATTRIBUTE TYPE="SOMEATTRIBUTE">
    <IRA:PARSE>?VALUE?&@SOMEATTRIBUTE(%VALUE%)</IRA:PARSE>
    <IRA:GENERATE>
        ?VALUE?!XMLEMITATTRIBUTE("SOMEATTRIBUTE",%VALUE%)
    </IRA:GENERATE>
</ATTRIBUTE>
```

The above illustrated augmentations are not required, because the behavior they specify is identical to the default behavior that would occur without them. The rules for parsing and generation for a non-standard example as previously described are as follows:

of the hierarchical semantic document model is transformed into a data structure conforming to a tangled structure document model. The methodology of FIG. 8 may also be employed utilizing a rule set, an IRA pattern or an IRA schema.

```
<ELEMENT TYPE="EYECOLOR">
    <IRA:PARSE>?VALUE?&@EYECOLOR(%VALUE%)</IRA:PARSE>
    <IRA:GENERATE ATTRIBUTE="EYECOLOR">
        ?VALUE?!XMLEMITELEMENT("EYECOLOR")!XMLEMITTEXT(%VALUE%)
    </IRA:GENERATE>
</ELEMENT>
<ELEMENT TYPE="LOVES">
    <IRA:PARSE>?VALUE?&LOVES(~PERSON/PERSON[NAME=%VALUE%])</IRA:PARSE>
    <IRA:GENERATE RELATION="LOVES">
        !XMLEMITELEMENT("LOVES")!XMLEMITTEXT(@NAME)
    </IRA:GENERATE>
</ELEMENT>
```

Figure 9:
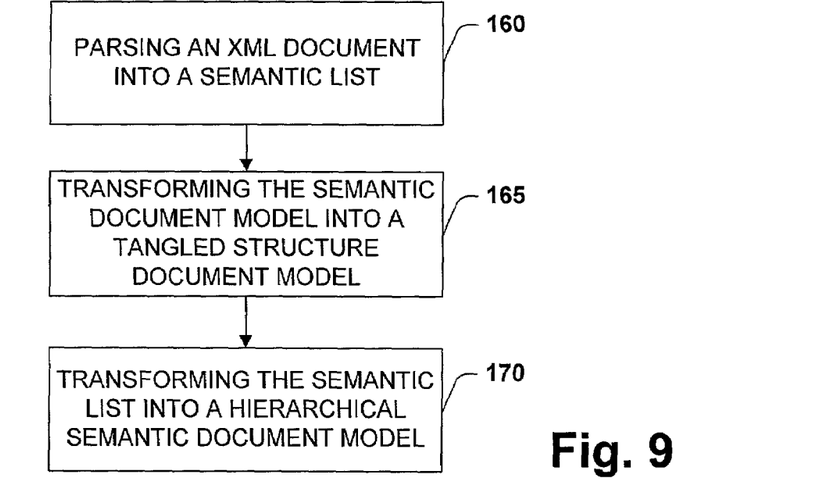
FIG. 9 illustrates a flow diagram of one particular methodology for transforming an XML document having a data structure conforming to IRA to a DOM data structure in accordance with one aspect of the present invention.

In view of the structure described above with respect to FIGS. 1-6, a methodology for providing the particular aspects of the invention may be better appreciated with respect to the flow diagrams of FIGS. 7-10. While, for purposes of simplicity of explanation, the methodologies of FIGS. 7-10 are shown and described as a series of steps, it is to be understood and appreciated that the present invention is not limited to the order of steps, as some steps may, FIG. 9 illustrates a methodology for transforming an XML document from a data structure conforming to an IRA Object Model to a hierarchical semantic object model in accordance with one aspect of the present invention. At step 160, an XML document is parsed to provide a semantic list. At step 165, the semantic list is transformed into a data structure conforming to a tangled structure semantic document model. At step 170, the data structure of the tangled structure semantic document model is transformed into a data structure conforming to a hierarchical semantic object model. The methodology of FIG. 9 may also be employed utilizing a relation generation rule set, an IRA pattern or an IRA schema.

Figure 10:
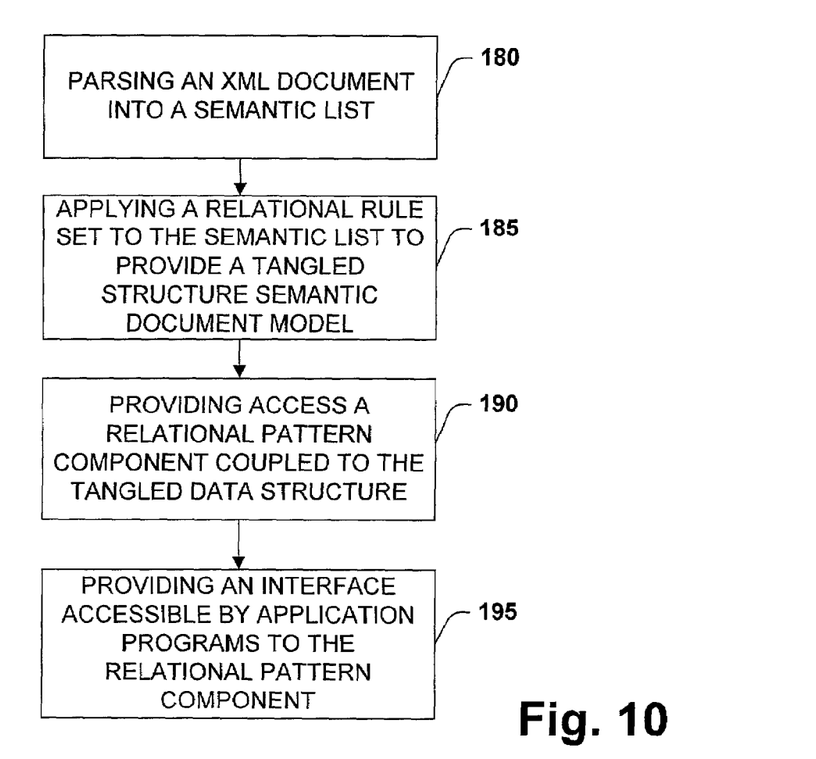
FIG. 10 illustrates a flow diagram of one particular methodology for providing exposure to a data structure conforming to the IRA Object Model in accordance with one aspect of the present invention.

FIG. 10 illustrates a methodology for providing access to a data structure conforming to an IRA Object Model in accordance with one aspect of the present invention. At step 180, an XML document is parsed to provide a semantic list. At step 185, a relational rule set is applied to the semantic list to provide a data structure conforming to a tangled structure semantic document model. At step 190, a relational pattern component having a plurality of relational patterns is coupled to the data structure. At step 195, an interface component is provided for allowing application programs access to the plurality of relational patterns.

Figure 11:
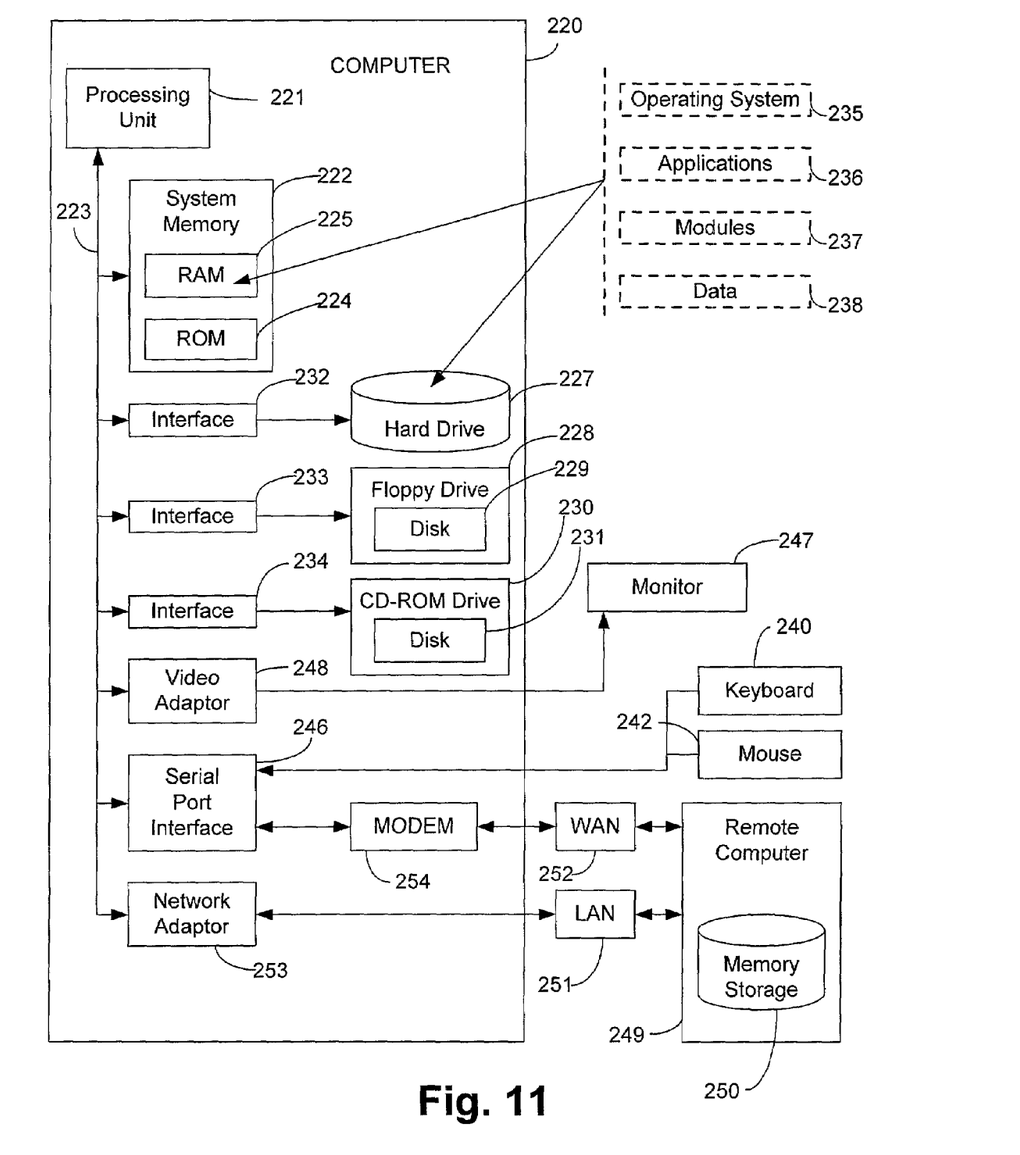
FIG. 11 illustrates a block diagram of a computer system in accordance with an environment of the present invention.

With reference to FIG. 11, an exemplary system for implementing the invention includes a conventional personal or server computer 220, including a processing unit 221, a system memory 222, and a system bus 223 that couples various system components including the system memory to the processing unit 221. The processing unit may be any of various commercially available processors. Dual microprocessors and other multi-processor architectures also can be used as the processing unit 221.

The system bus may be any of several types of bus structure including a memory bus or memory controller, a peripheral bus, and a local bus using any of a variety of commercially available bus architectures. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment. A number of program modules may be stored in the drives and RAM 225, including an operating system 235, one or more application programs 236, other program modules 237, and program data 238.

A user may enter commands and information into the computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote server or client computer 249. The remote computer 249 may be a workstation, a server computer, a router, a peer device or other common network node, and typically includes many or all of the elements described relative to the computer 220, although only a memory storage device 250 has been illustrated in FIG. 11. The logical connections depicted in FIG. 11 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodologies and/or computer architectures suitable for carrying out the present invention may be employed and are intended to fall within the scope of the hereto appended claims.

The invention has been described with reference to particular aspects of the invention. Obviously, modifications and alterations will occur to others upon reading and understanding the foregone detailed description. It is intended that the invention be construed as including all such modifications alterations, and equivalents thereof.

What is claimed is:

1. A method in a computer system for generating a new representation of a document, the document having a current representation that is based on a hierarchical model in which hierarchical relationships between elements are defined by the model and non-hierarchical relationships between elements and content of elements are not defined by the model, the method comprising:

identifying entities referenced by elements of the current representation that are to be items in the new representation, wherein the current representation represents some relationships between entities hierarchically by nesting elements and other relationships non-hierarchically by referring to another element of the hierarchical model, such that the current representation contains multiple references to at least one entity, wherein identifying entities comprises parsing expressions of the elements of the current representation using parsing rules;

for each identified entity, creating for the new representation an item corresponding to the identified entity, wherein only one item is created in the new representation for the at least one entity having multiple references in the current representation, wherein creating the item comprises generating the new representation using generation rules that specify patterns for creating items of the new representation;

for each created item, adding to the item that is a subject of a hierarchical relationship as indicated by the current representation a relation to each item corresponding to an identified element that is an object of the hierarchical relationship as indicated by the current representation; and for non-hierarchical relationships between elements and content of elements as indicated by the current representation, adding to an item corresponding to the element that is the subject of the non-hierarchical relationship a relation to the item corresponding to the content of the element that is the object of the non-hierarchical relationship, wherein the created items and the added relations form the new representation of the document, such that when an entity is the subject of both a hierarchical and nonhierarchical relationship in the current representation, the new representation contains a single instance of the entity and wherein the new representation forms a data structure that can be traversed by relationships between entities such that a program can use the new representation to interpret hierarchical and nonhierarchical relationships in the same way.

2. The method of claim 1 wherein in the current representation the hierarchical relationships are explicit and the non-hierarchical relationships are implicit.

3. The method of claim 1 wherein the hierarchical model is XML based.

4. The method of claim 3 wherein the hierarchical relationships are indicated by parent and child relationships of XML elements.

5. The method of claim 3 wherein a non-hierarchical relationship is an attribute of an XML element that refers to another XML element.

6. The method of claim 3 wherein a non-hierarchical relationship is a property of an XML element that refers to another XML element.

7. The method of claim 3 wherein a non-hierarchical relationship is content of an XML element that refers to another XML element.

8. The method of claim 1 wherein the new representation is based on an item, relationship, and attribute model.

9. A computer-readable medium containing instructions for controlling a computer system to generate a new representation of a document, the document having a current representation based on an XML model in which hierarchical relationships between elements are defined by the XML model and non-hierarchical relationships between elements and contents of elements are not defined by the model, by a method comprising:

identifying entities referenced by elements of the current representation that are to be items of the new representation, wherein the current representation represents some relationships between entities hierarchically by nesting elements and other relationships non-hierarchically by referring to another element of the hierarchical model, such that the current representation contains multiple references to at least one entity, wherein identifying entities comprises parsing expressions of the elements of the current representation using parsing rules;

for each identified entity, creating for the new representation an item corresponding to the identified entity, wherein only one item is created in the new representation for the at least one entity having multiple references in the current representation, wherein creating the item comprises generating the new representation using generation rules that specify patterns for creating items of the new representation;

for each created item, adding to the item that is a subject of a hierarchical relationship as indicated by the current representation a relation to each item corresponding to an identified element that is an object of the hierarchical relationship as indicated by the current representation; and for non-hierarchical relationships between elements and content of elements as indicated by the current representation, adding to an item corresponding to the element that is the subject of the non-hierarchical relationship a relation to the item corresponding to the content of the element that is the object of the non-hierarchical relationship, wherein the created items and the added relations form the new representation of the document, such that when an entity is the subject of both a hierarchical and nonhierarchical relationship in the current representation, the new representation contains a single instance of the entity and wherein the new representation forms a data structure that can be traversed by relationships between entities such that a program can use the new representation to interpret hierarchical and nonhierarchical relationships in the same way.

10. The computer-readable medium of claim 9 wherein the hierarchical relationships are explicit and the non-hierarchical relationships are implicit.

11. The computer-readable medium of claim 9 wherein the hierarchical model is XML based.

12. The computer-readable medium of claim 9 wherein the hierarchical relationships are indicated by parent and child relationships of XML elements.

13. The computer-readable medium of claim 9 wherein a non-hierarchical relationship is an attribute of an XML element that refers to another XML element.

14. The computer-readable medium of claim 9 wherein a non-hierarchical relationship is a property of an XML element that refers to another XML element.

15. The computer-readable medium of claim 9 wherein a non-hierarchical relationship is content of an XML element that refers to another XML element.

16. The computer-readable medium of claim 9 wherein the new representation of the document is based on an item, relationship, and attribute model.

* * * * *